US009022279B2

(12) United States Patent
Bolton et al.

(10) Patent No.: US 9,022,279 B2
(45) Date of Patent: May 5, 2015

(54) METHOD AND SYSTEM FOR LOCATING AN ACCESSORY AND AN APPLICATION FOR USE WITH A USER DEVICE

(75) Inventors: Lawrence G. Bolton, Fremont, CA (US); Peter T. Langenfeld, Belmont, CA (US); Shyam S. Toprani, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 698 days.

(21) Appl. No.: 12/816,345

(22) Filed: Jun. 15, 2010

(65) Prior Publication Data

US 2011/0303741 A1    Dec. 15, 2011

(51) Int. Cl.
| G06F 17/00 | (2006.01) |
| H04M 3/00 | (2006.01) |
| H04M 1/00 | (2006.01) |
| G06F 3/00 | (2006.01) |
| G06F 13/00 | (2006.01) |
| G06Q 10/08 | (2012.01) |

(52) U.S. Cl.
CPC .................................. G06Q 10/087 (2013.01)

(58) Field of Classification Search
USPC ........ 235/375; 455/418–420, 556.1; 709/230; 710/11, 105
See application file for complete search history.

(56) References Cited

U.S. PATENT DOCUMENTS

| 6,671,749 | B2 | 12/2003 | Williams et al. |
| 6,725,260 | B1 * | 4/2004 | Philyaw ........................ 709/220 |
| 6,789,111 | B1 | 9/2004 | Brockway et al. |
| 7,062,261 | B2 | 6/2006 | Goldstein et al. |
| 2003/0220988 | A1 | 11/2003 | Hymel et al. |
| 2004/0088180 | A1 | 5/2004 | Akins, III |
| 2004/0152457 | A1 | 8/2004 | Goldstein et al. |
| 2004/0192274 | A1 * | 9/2004 | Vuori ............................. 455/418 |
| 2005/0011957 | A1 | 1/2005 | Attia et al. |
| 2007/0214155 | A1 | 9/2007 | Chang et al. |
| 2007/0271387 | A1 | 11/2007 | Lydon et al. |

(Continued)

FOREIGN PATENT DOCUMENTS

| CN | 101408926 A | 4/2009 |
| EP | 2230605 A1 | 9/2010 |

(Continued)

OTHER PUBLICATIONS

Combined Search and Examination Report for UK Patent Application No. GB1110035.1, mailed on Oct. 14, 2011, 9 pages.

(Continued)

*Primary Examiner* — Michael G Lee
*Assistant Examiner* — Laura Gudorf
(74) *Attorney, Agent, or Firm* — Kilpatrick Townsend & Stockton LLP

(57) ABSTRACT

A method for identifying an application usable with an accessory is provided. The method includes receiving an accessory identifier associated with the accessory, identifying an application protocol associated with the accessory identifier, identifying an application that supports the application protocol, and providing information about the application to a user device. A method for identifying an accessory usable with an application is also provided. The method includes receiving information about an application, determining an application protocol associated with the application, determining an accessory that supports the application protocol, and providing information about the accessory to a user device.

11 Claims, 8 Drawing Sheets

(56) References Cited

U.S. PATENT DOCUMENTS

| | | |
|---|---|---|
| 2008/0091528 A1 | 4/2008 | Rampell et al. |
| 2008/0183852 A1* | 7/2008 | Pramer et al. ................. 709/223 |
| 2008/0242284 A1* | 10/2008 | Vechey et al. ................. 455/415 |
| 2008/0283852 A1 | 11/2008 | Tsuji et al. |
| 2009/0117846 A1 | 5/2009 | Mavrakakis |
| 2009/0198361 A1 | 8/2009 | Schubert et al. |
| 2009/0228379 A1 | 9/2009 | Honts |

FOREIGN PATENT DOCUMENTS

| | | |
|---|---|---|
| WO | 2007/066174 A1 | 6/2007 |
| WO | 2010/027694 A1 | 3/2010 |
| WO | WO 2011/159534 A1 | 12/2011 |

OTHER PUBLICATIONS

International Search Report and Written Opinion for PCT Patent Application No. PCT/US2011/039613, mailed on Oct. 5, 2011, 14 pages.

European Search Report mailed on Sep. 2, 2011, for EP Patent Application No. 11169974.0, 7 pages.

Office Action mailed Dec. 29, 2014 in Chinese Patent Application No. 201180021475.3, 25 pages.

* cited by examiner

| ACCESSORY ID | ACCESORY NAME | APPLICATION PROTOCOL |
|---|---|---|
| B45672WC | EXTERNAL SPEAKERS | PROTOCOL A / PROTOCOL D |
| 34XYTOPR | BLOOD GLUCOSE METER | PROTOCOL F / PROTOCOL M |
| ⋮ | ⋮ | ⋮ |

FIG. 5

| APPLICATION PROTOCOL | APPLICATION |
|---|---|
| PROTOCOL A / PROTOCOL D | APPLICATION # 23 |
| PROTOCOL Y | APPLICATION # 7 |
| ⋮ | ⋮ |

FIG. 6

| | | |
|---|---|---|
| COMPANY Y WIRELESS HEADSET | AISLE 3, BIN 23 | $69.99 |
| COMPANY Z EXTERNAL SPEAKERS | AISLE 8, BIN 12 | $39.99 |

METHOD AND SYSTEM FOR LOCATING AN ACCESSORY AND AN APPLICATION FOR USE WITH A USER DEVICE

BACKGROUND

Consumers are increasingly demanding devices that can perform multiple tasks. Recent advancements in smart phones and other portable communication devices are geared towards making these devices as versatile as possible.

In many instances, these consumer devices have to work in conjunction with other devices to realize expanded functionalities. Such other devices are commonly referred to as accessories. An accessory usually performs some specialized function in conjunction with the consumer device. For example, a consumer device having music playback capability can be connected to external speakers for music playback since the speakers of the consumer device itself may not be powerful enough for music playback. There are numerous accessories that are being sold in the market today for use with such consumer devices.

An accessory may need a software application for control and operation of the accessory. With the number of available accessories growing at an exponential rate, it is often difficult for a user to determine which accessory supports which software application and vice versa.

SUMMARY

Certain embodiments of the present invention provide system and methods for locating an application based on information about the accessory. In some embodiments, an application and accessory determination server receives information about an accessory. The application and accessory determination server then determines an application protocol that corresponds to the accessory. Based on that determination, the application and accessory determination server determines one or more applications that correspond to the application protocol. This information can then be provided to the user via a user device.

In other embodiments, a method for locating an accessory is provided. In this instance, the application and accessory determination server receives information about an application. Based on this information, the application and accessory determination server determines one or more application protocols that the application supports. Thereafter, the application and accessory determination server checks to see whether there are any accessories that support the one or more application protocols.

The following detailed description, together with the accompanying drawings will provide a better understanding of the nature and advantages of the present invention.

BRIEF DESCRIPTION OF THE DRAWINGS

FIG. 5 is a table illustrating association information between an accessory identifier and an application protocol according to an embodiment of the present invention.

FIG. 6 is a table illustrating association information between an application protocol and an application according to an embodiment of the present invention.

DETAILED DESCRIPTION

Figure 1:
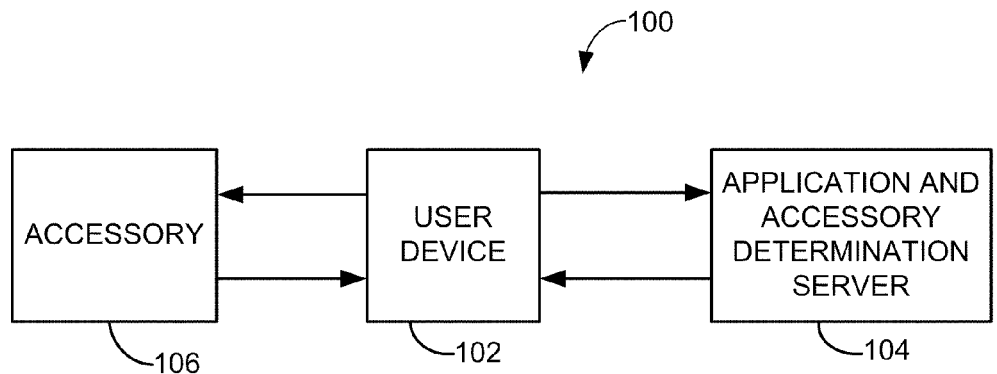
FIG. 1 is a block diagram of a system according to an embodiment of the present invention.

Embodiments of the present invention provide methods and systems for locating an accessory for use with an application and/or an application for use with an accessory.

In some embodiments, a user can use his user device, e.g., a mobile phone, to communicate information about an accessory to an application and accessory determination server. Based on that information, the application and accessory determination server can provide a list of one or more applications that are compatible with the accessory.

In other embodiments, a user can use his user device to communicate information about an application to an application and accessory determination server. Based on that information, the application and accessory determination server can provide a list of one or more accessories that are compatible with the application.

An accessory can communicate with the user device and also with a particular application executing on the user device that can be used to control the accessory. The protocol used by the accessory and the user device to communicate with each other is referred to as the "accessory communication protocol". The protocol used by the accessory and an application on the user device to communicate with each other device is referred to as an "application communication protocol" or "application protocol".

As described above, an accessory and a user can communicate with each other using an accessory communication protocol. An accessory communication protocol can specify communication commands, transport links, authentication routines, identification processes, lingoes, packet structures, data types, or any other suitable command or data that can be used to communicate between an accessory device and a user device.

An application executing on a user device and the accessory can also communicate with each other using the application communication protocol. In some embodiments, an application communication protocol can specify communication commands, packet structures, data types, lingoes, message formats, etc., for communication between the application and the accessory. In some embodiments, at least some of the communication commands, packet structures, data types, lingoes, message formats specified by the application communication protocol can be different from those specified by the accessory communication protocol. In other embodiments, at least some of the communication commands, packet structures, data types, lingoes, message formats specified by the application communication protocol can be the same as those specified by the accessory communication protocol.

In some embodiments, the application protocol can use the transport link specified by the accessory communication protocol. An application communication protocol can be developed, for example, by the developer of the application and/or accessory. In some embodiments, an application communication protocol can include application and/or accessory specific commands, data structures, etc. Furthermore, the terms "application communication protocol" and "application protocol" can be used interchangeably. The terms "accessory communication protocol", "general communication protocol", and "general protocol" can also be used interchangeably. However, it is to be noted that the application communication protocol and accessory communication protocol are distinct from one another. The differences between an accessory communication protocol and an application protocol are described in detail below.

FIG. 1 shows a system 100 for determining an accessory for use with an application and/or determining an application for use with an accessory according to an embodiment of the present invention. System 100 includes a user device 102, an application and accessory determination server 104 (referred to henceforth in the description as the "determination server"), and an accessory 106.

User device 102 can be a personal computer or any type of mobile computing and/or communication device without limitation. For example, user device 102 can be an iPod Touch™, an iPhone™, an Android compatible device and/or a Blackberry device. Moreover, user device 102 can provide media player capability, networking, web browsing, e-mail, word processing, data storage, application execution, and/or any other computing or communication functions.

Accessory 106 can be any device capable of communicating with user device 102 such as, e.g., an external speaker system, an external video device, a multimedia device, a consumer electronic device, a test instrument, a home appliance (e.g., refrigerator or dishwasher), exercise equipment, a security system, a home or office automation system, a camera, a user input device (e.g., keyboard, mouse, game controller), a measurement device, a medical device (e.g., glucose monitor or insulin monitor), a point of sale device, an automobile, an automobile accessory (e.g., a car stereo system or car navigation system), a radio (e.g., FM, AM and/or satellite), an entertainment console on an airplane, bus, train, or other mass transportation vehicle, etc. Any type of device that can be used in conjunction with a user device can be used as an accessory device.

Determination server 104 can be implemented using any general purpose computer having suitable capability and programming. Details of an embodiment of the determination server are provided below in connection with FIG. 4.

In some embodiments, user device 102 can receive information, e.g., an accessory identifier, associated with accessory 106. User device 102 can communicate the received accessory identifier to determination server 104. Determination server 104 can search a database, based on the accessory identifier, to determine an application protocol that is compatible with the accessory and further determine one or more applications that are compatible with the application protocol. Determination server 104 can communicate that information to user device 102. In other embodiments, determination server 104 can receive information about an application and based on that information, can determine one or more accessories that can be controlled/operated using the application. The information about the one or more accessories can then be communicated to user device 102 for presentation to the user.

In other embodiments, accessory 106 can directly communicate with determination server 104 to find out an application that can support accessory 106. In this instance, the accessory does not have to communicate with user device 102 in order to query determination server 104. In some embodiments, determination server may not be associated with user device 102, i.e. determination server may be able to communicate directly with an accessory without having to communicate via user device 102.

Figure 2:
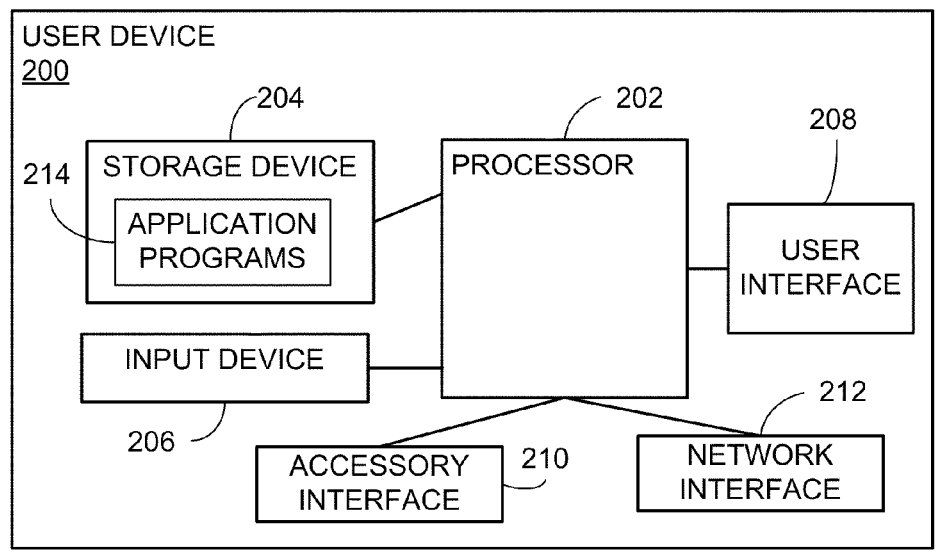
FIG. 2 is a block diagram of a user device according to an embodiment of the present invention.

FIG. 2 shows a block diagram of a user device 200 (e.g., implementing user device 102 of FIG. 1) according to an embodiment of the present invention. User device 102 can include processor 202, storage device 204, input device 206, user interface 208, accessory interface 210, and network interface 212.

Processor 202, which can be implemented as one or more integrated circuits (including, e.g., a conventional microprocessor or microcontroller), can control the operation of user device 200. For example, in response to input signals provided by user interface 208 and/or input device 206, processor 202 can perform various tasks such as communicating the received information to determination server 104, selecting and playing media assets that may be stored in stored in storage device 204; accessing various networks (e.g., a mobile telephone network, the Internet, local area network, or the like) to communicate and/or retrieve data using network interface 212, executing various application programs (Apps) 214 residing on storage device 204, and so on. Processor 202 can also manage communication with accessories via accessory interface 210.

Storage device 204 may be implemented, e.g., using disk, flash memory, or any other non-volatile storage medium. Storage device 204 can store application programs 214 that are executable by processor 202, system programs and other program code (not explicitly shown) that can be used in managing communication with various accessories. In some embodiments, storage device 204 can also store media assets such as audio, video, still images, or the like, that can be played by user device 200, along with metadata describing the media assets (e.g., asset name, artist, title, genre, etc.), playlists (lists of assets that can be played sequentially or in random order), and the like. Storage device 204 can also store any other type of information such as information about a user's contacts (names, addresses, phone numbers, etc.), scheduled appointments and events, notes, information about all accessories used with user device 200, information about all applications installed on user device 200 including any that were later removed from user device 200, and/or other personal information.

Input device 206 can include one or more capture devices such as a barcode reader, a radio frequency identifier (RFID) tag reader, a camera, an infrared scanner, etc. In some embodiments, accessory interface 210 can also act as input device 206. In this instance, an accessory may communicate with user device 200 via accessory interface 210 to provide input that can be used to determine an application supported by the accessory. In some embodiments, input device 206 is configured to capture a particular type of information, e.g., reading a barcode on an accessory package, reading a RFID tag associated with an accessory, etc. In some embodiments, user device 200 can process the captured information and convert it into a form usable by the determination server. For example, a camera may be used to capture an image of a packaged accessory placed on a shelf in a store. Processor 202 can process the captured image to extract the accessory name and other identifying information, e.g., a model number, of the accessory. This information can be communicated to the determination server for determining a compatible application for use with the accessory. In some embodiments, input device 206 can be integrated with user interface 208 such that input device 206 can be accessed using user interface 208 and one or more application programs 214.

User Interface 208 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 208 to invoke the functionality of user device 200 and can also view and/or hear output from user device 200 via user interface 208.

Accessory interface 210 can include a number of signal paths configured to carry various signals between user device 200 and accessory 300. In one embodiment, accessory interface 210 includes a 30 pin connector corresponding to the connector used on iPod® and iPhone™ products manufactured and sold by Apple Inc.; other connectors can also be used. Alternatively or additionally, accessory interface 210 can include a wireless interface (e.g., Bluetooth or the like).

In some embodiments, user device 200 can also use accessory interface 210 to communicate with a host computer (not shown) that executes an asset management program that can provide media and/or applications for a user device (for example, iTunes® or Microsoft's application store). The asset management program can enable a user to add media assets and/or applications to user device 200 and/or remove media assets and/or applications from user device 200. The user can update metadata associated with media assets on user device 200. In some embodiments, the user can also interact with the asset management program to create and update playlists and/or applications as well as other documents. In an embodiment, the host computer maintains a master database of media assets and/or applications and can access other databases, for example, through the Internet (including associated metadata and playlists), and the asset management program synchronizes the master database with the database maintained on storage device 204 of user device 200 automatically whenever user device 200 connects to the host computer. In other embodiments, user device 200 can use network interface 212 to communicate with a host computer and/or directly with various other servers to acquire applications, media assets and/or other data. In some embodiments, user device 200 can also include functionality of the host computer described above. In this instance, user device 200 also functions as the host computer and no additional host computer is needed.

Network interface 212 can provide an interface to one or more communication networks. For example, network interface 212 can incorporate a radio-frequency (RF) transceiver and suitable components for communicating via a mobile communication network such as a mobile telephone network. Additionally or instead, network interface 212 can incorporate a wireless connection to the Internet (e.g., a WiFi transceiver, 3G transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 212 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 202 (e.g., encoding, decoding, and/or other processing in the digital domain), or a dedicated digital signal processor can be provided.

Application programs (also referred to herein as "applications" or "apps") 214 can include any program executable by processor 202. In some embodiments, certain applications can be installed on user device 200 by its manufacturer, while other applications can be installed by a user or another accessory. Examples of application programs can include video game programs, personal information management programs, programs for playing media assets and/or navigating the media asset database, programs for controlling a telephone interface to place and/or receive calls, and so on. Certain application programs 214 may provide communication with and/or control of accessory 300, and certain application programs 214 may be responsive to control signals or other input from accessory 300; examples are described below.

Figure 3:
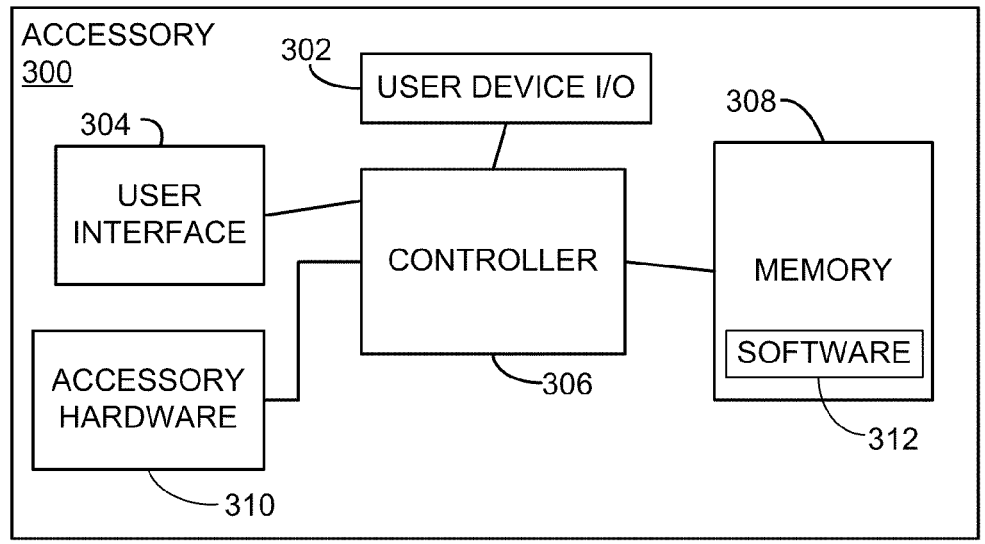
FIG. 3 is a block diagram of an accessory according to an embodiment of the present invention.

FIG. 3 is a block diagram of an accessory 300 (e.g., implementing accessory 106 of FIG. 1) according to an embodiment of the present invention. Accessory 300 can include a user device interface 302, a user interface 304, a controller 306, and a memory 308.

User device interface 302 can include a number of signal paths configured to carry various signals between accessory 300 and user device 200. In one embodiment, user device interface 302 can include a connector adapted to mate with the 30-pin connector used on iPod® and iPhone™ products manufactured and sold by Apple Inc. Other connectors can also be used; for example, user device interface 302 can include a standard USB or FireWire connector or the like. Alternatively or additionally, user device interface 302 can include a wireless interface (e.g., Bluetooth or the like).

User interface 304 can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of user interface 304 to invoke the functionality of accessory 300 and can view and/or hear output from accessory 300 via user interface 304. In addition, in some embodiments, a user can operate user device 200 (or applications executing thereon) via accessory user interface 304.

Controller 306 can include, e.g., a microprocessor or microcontroller executing program code to perform various functions such as digital audio decoding, analog or digital audio and/or video processing, processing of user input, controlling of accessory functionality and the like. Controller 306 can also manage communication with a user device via user device interface 302.

Memory 308 can be implemented using any type of memory, disk, or other storage medium that can store program code for controller 306 and/or data. For example, memory 308 can store accessory specific software that can provide instructions for controller 306 to interact with accessory hardware, and/or user interface 304. In some embodiments, accessory 300 can receive information (e.g., user input, accessory related information, and/or application information) from user device 200, and such information can also be stored in memory 308.

Accessory hardware 310 can represent any hardware needed to enable desired functionality of accessory 300. For example, accessory hardware 310 can include one or more data gathering devices, such as any type of sensor or meter. In some embodiment, accessory hardware 310 can include an electrical meter that generates data representing electrical characteristics (resistance, voltage difference, or the like), a light sensor that detects light and/or patterns of light, a motion sensor, a temperature sensor, a humidity sensor, a pressure sensor, a chemical sensor that responds to the presence of selected chemicals (e.g., potentially toxic gases such as carbon monoxide), and so on. Accessory hardware 310 can also include one or more medical device such as a glucose meter, respiratory meter, heart rate and/or heart function monitor, blood pressure monitor, or the like.

In some embodiments, accessory hardware 310 that includes a data gathering device can provide one or more electrical signals (e.g., voltage, resistance, and/or current) that correspond to or represent the physical data. Analog and/or digital signals in a variety of formats may be used. Accessory hardware 310 can also include signal processing components that process the signal before sending it to controller 306. In some embodiments, accessory hardware 310 can communicate the electrical signal directly to controller 306, which can process the signal. For example, if accessory specific hardware 310 includes a thermometer implemented using a thermocouple, resistance data from the thermocouple can be converted into temperature data by accessory specific hardware 310, by controller 306, or both. Further, signals representing data gathered by accessory specific hardware 310 can be sent (with or without processing by controller 306) to an application executing on user device 200, e.g., using an application protocol. Thus, an application executing on user device 200 can also process data gathered using accessory hardware 310.

In some embodiments, accessory hardware 310 can include one or more computer-controllable devices. Examples of computer-controllable devices include motors, actuators, lights, cameras, valves, speakers, display screens, printers, and/or any other equipment that is controllable by controller 306. In some embodiments, an application executing on user device 200 can communicate control signals to accessory 300, and controller 306 can operate accessory hardware 310 in response to the control signals.

In some embodiments, accessory hardware 310 can include components of user interface 304. Thus, an application executing on user device 200 can receive user input from accessory 300, provide output to a user via accessory 300, and/or control, interact with, or respond to any operation accessory 300 is capable of performing.

In some embodiments, accessory hardware 310 can include network and/or communication interfaces. For example, accessory hardware 310 can include an RF receiver (e.g., for FM, AM, satellite radio, and/or other bands) and/or an RF transmitter (e.g., a short-range transmitter for personal use). In other embodiments, accessory hardware 310 can include a communication interface to a personal area network, such as a Bluetooth transceiver or other short-range wireless communication interface. In still other embodiments, accessory hardware 310 can include a telephone interface, GSM, CDMA, and/or other voice and/or data network interfaces.

Accordingly, accessory hardware 310 can encompass any hardware component for which interoperability with a user device may be desirable.

It will be appreciated that the system configurations and components described herein are illustrative and that variations and modifications are possible. The user device and/or accessory may have other capabilities not specifically described herein. Further, while the user device and the accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory interface 210 of user device 200 and user device interface 302 of accessory 300 allow user device 200 to be connected to accessory 300 and subsequently disconnected from accessory 300. As used herein, user device 200 and accessory 300 are "connected" whenever a communication channel between accessory interface 210 and user device 200 is established and are "disconnected" whenever the communication channel is terminated. Connection can be achieved by physical attachment (e.g., between respective mating connectors of user device 200 and accessory 300), by an indirect connection such as a cable, or by establishing a wireless communication channel. Similarly, disconnection can be achieved by physical detachment, disconnecting a cable, powering down user device 200, or closing the wireless communication channel. Thus, a variety of communication channels can be used, including wired channels such as USB, FireWire, or universal asynchronous receiver/transmitter ("UART"), or wireless channels such as Bluetooth and WiFi. In some embodiments, multiple communication channels between a user device and the accessory can be opened concurrently, or a user device can be connected to multiple accessories, with each accessory using a different communication channel.

As described above, an accessory can communicate with a user device using an accessory communication protocol. An application configured to control and operate an accessory via the user device can communicate with the accessory using an application protocol. The accessory communication protocol and the application protocol are described below.

Regardless of the particular communication channel, as long as user device 200 and accessory 300 are connected to each other, the devices can communicate by exchanging commands and data as specified by an accessory communication protocol. The accessory communication protocol can define a format for sending messages between user device 200 and accessory 300. For instance, the accessory communication protocol may specify that each message is sent in a packet with a header, a payload, and/or a tail. The header can provide basic information such as a start indicator, length of the packet, transaction ID, and a command to be processed by the recipient, while the payload provides any data associated with the command; the amount of associated data can be different for different commands, and some commands may provide for variable-length payloads. The packet can also include a tail that may provide error-detection or error-correction codes, e.g., as known in the art, and/or other information as desired. In various embodiments, the accessory communication protocol can define specific commands to indicate an action to be taken by the recipient, to signal completion of a task, change of state, or occurrence of an error; and/or to identify the nature of the associated data. In some embodiments, the commands may be defined such that any particular command is valid in only one direction.

The accessory communication protocol can also specify one or more physical transport links usable for transmitting signals between devices. For example, the transport link can be a USB link, a UART link, a FireWire link, a Bluetooth link, a WiFi link, a parallel link, a serial link, etc. At this level, the accessory communication protocol can specify, e.g., start bytes, sync bytes, stop bytes, and/or other auxiliary signals. In some embodiments, the accessory communication protocol can provide for multiple alternative transport links. Thus, a single user device can support communication over a variety of physical links including wired and/or wireless links.

The accessory communication protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all user devices to which an accessory can be connected, support every lingo defined within the accessory communication protocol or every command of a particular lingo (for instance, different devices might use different versions of a given lingo).

In some embodiments, every accessory 300 and every user device 200 that are designed to interoperate with each other support at least a "general" lingo that includes commands common to all such devices. The general lingo can include commands enabling the user device and the accessory to identify themselves to each other and to provide at least some information about their respective capabilities, including which (if any) other lingoes each supports and which capabilities of the other device each intends to use while connected.

The general lingo can also include authentication commands that the user device can use to verify the purported identity and capabilities of the accessory (or vice versa), and the accessory (or user device) may be blocked from invoking certain commands or lingoes if the authentication is unsuccessful. For example, an authentication manager (not shown) within user device 200 can communicate with an authentication controller (also not shown) within accessory 300 to perform an authentication procedure, e.g., based on public key cryptography and a store of digital certificates maintained within the authentication manager of user device 200.

The general lingo or another lingo of the accessory communication protocol can also include "tunnel" commands that allow an exchange of arbitrary information between an application 214 executing on user device 200 and accessory 300. For example, a TunnelToAcc command can be defined as being sendable by user device 200 to accessory 300. The payload of this command can be any data, control signals, or other information that an application 214 executing on user device 200 can generate and communicate to accessory 300. Similarly, a TunnelToHost command can be defined as being sendable by accessory 300 to user device 200. The payload of this command can be any data, control signals, or other information that accessory 300 can generate and communicate to an application 214 executing on user device 200. These tunnel commands can be defined such that the accessory communication protocol is agnostic as to the payload content.

In some embodiments, the accessory can communicate with an API associated with one or more applications at the user device using the application protocol. In some embodiments, the accessory can communicate with an API associated with one or more application using the accessory communication protocol. In other embodiments, the accessory can also communicate with the user device operating system using either or both of the accessory communication protocol and/or the application protocol.

An accessory communication protocol supported by a user device and an accessory can include various other lingoes, such as a simple remote lingo that allows the accessory to communicate a command indicating a function of the user device to be invoked, a remote user interface lingo that can be used to communicate commands and data related to replicating all or part of a user interface of the user device on the accessory (thereby supporting a more advanced remote control), a tuner lingo that allows a user to control a tuner accessory by operating the user device, a storage lingo that allows the accessory to store data on the user device, and so on. Any lingo or combination of lingoes or other commands or groups of commands can be used in connection with embodiments described herein.

It will be appreciated that the accessory communication protocol described herein is illustrative and that variations and modifications are possible.

In some embodiments, an accessory and an application can exchange any messages desired, where the term "message" refers generally to any type of control signal, event, data, status or configuration information, transaction ID, or any other type of information available to the sender. To facilitate exchange of messages, an accessory and an application can use a mutually agreed-upon application protocol. The application protocol can specify a universe of accepted formats for messages that can be exchanged. Devices or programs adhering to a particular application protocol can structure the messages they communicate in accordance with the application protocol's universe of accepted formats and can interpret messages they receive in accordance with the application protocol's universe of accepted formats. For instance, in the case of binary digital communication, the application protocol can specify how the bits comprising the message are to be interpreted by the recipient. Thus, like the accessory communication protocol, an application protocol can specify packet structures; commands; lingoes; payload formats; and/or other formats, data structures, semantics or rules of interpretation such that a particular message sent by one participant will be correctly interpreted by the recipient. Indeed, in some embodiments, portions of the accessory communication protocol can be directly adopted as all or part of an application protocol for a particular accessory and/or application.

In some embodiments, accessory protocol messages can be sent between devices by encapsulating, wrapping, or packaging the messages within packets conforming to the accessory communication protocol, e.g., using tunneling commands as described above. Thus, the transport link specified by the accessory communication protocol can be used, and it is not necessary for an application protocol to specify a physical transport link.

It is contemplated that an unlimited range of accessories and applications that use a variety of different application protocols can be created for use with a particular user device (or various user devices). In some embodiments, user device 200 can be configured with application protocol management capability (e.g., using an application manager) that includes tracking the application protocol(s) used by each connected accessory and the application protocol(s) used by each executing and/or installed application.

Figure 4:
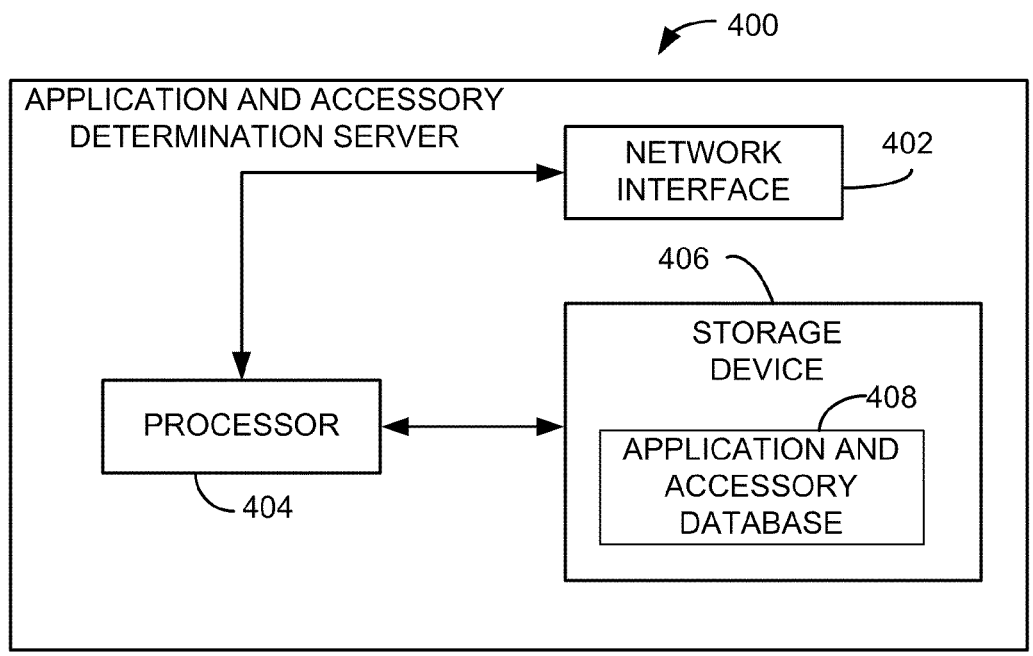
FIG. 4 is a block diagram of an application and accessory determination server according to an embodiment of the present invention.

As described above, the user device can communicate information about an accessory and/or an application to the determination server. FIG. 4 is a block diagram of a determination server 400 (e.g., implementing determination server 104 of FIG. 1) according to an embodiment of the present invention. Determination server 400 can include a network interface 402, a processor 404, and a storage device 406.

Network interface 402 can provide an interface to one or more user devices and/or accessories. For example, network interface 402 can incorporate a radio-frequency (RF) transceiver and suitable components for communicating via a mobile communication network such as a mobile telephone network. Additionally or instead, network interface 402 can incorporate a wireless connection to the Internet (e.g., a WiFi transceiver, 3G transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 402 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 404 (e.g., encoding, decoding, and/or other processing in the digital domain), or a dedicated digital signal processor can be provided.

Processor 404, which can be implemented as one or more integrated circuits (including, e.g., a conventional microprocessor or microcontroller), can control the operation of determination server 400. For example, in response to receiving an accessory identifier associated with an accessory from user device 200, processor 404 can perform various tasks such as determining an application protocol that is supported by the accessory, determining one or more application that are compatible with the application protocol, and providing that information to user device 200.

Storage device 406 can be implemented using any type of non-transitory memory, disk, or other storage medium that can store program code for processor 404 and/or data. In some embodiments, storage device 406 can comprise an application and accessory database 408. Application and accessory database 408 can store information about an association between an accessory and an accessory identifier, information about an association between the accessory identifier and an application protocol, information about an association between the application protocol and an application that supports the application protocol, and information about an association between the application protocol and the accessory. In some embodiments, application and accessory database 408 can be resident on the user device.

As described above, application and accessory database 408 can store association information among an accessory identifier, an accessory associated with the accessory identifier, an application protocol associated with the accessory, and an application that supports the application protocol. FIG. 5 and FIG. 6 show sample tables that can be included in application and accessory database 408 according to an embodiment of the present invention.

FIG. 5 shows table 500 storing association information between an accessory identifier, an accessory, and an application protocol that is supported by the accessory. Table 500 can include an accessory identifier section 502, an accessory name section 504, and an application protocol section 506.

Accessory identifier section 502 can include a listing of one or more accessory identifiers 510. Accessory identifier 510 can include a universal product code (UPC) for the accessory, a model number of the accessory, a serial number of the accessory, an image of the accessory, or any other identifying information that can uniquely identify the accessory. In most instances, a single accessory identifier is associated with each accessory. In some embodiments, accessory identifier 510 can be a combination of multiple pieces of information. For example, accessory identifier 510 can include the model number of the accessory, accessory name, accessory description, or the accessory manufacturer's name. In some embodiments, accessory identifier 510 can be an alphanumeric character string identifying the accessory.

Accessory name section 504 can include the commercial name of the accessory associated with a particular accessory identifier. In some embodiments, the accessory name can be displayed on the user device in response to an inquiry about a compatible accessory for a particular application.

Application protocol section 506 can list one or more application protocols 512 supported by an accessory and/or associated with an accessory identifier. As described above, an application protocol can be used to communicate accessory-specific messages between an application resident on the user device and the accessory. In some embodiments, an accessory can support more than one application protocol. In the instance where the accessory supports more than one protocol, the accessory can be usable using only one of the supported protocols or all of the supported protocols may be needed to make the accessory work.

In some embodiments, information in table 500 can be used to determine an application protocol that is supported by a particular accessory. It is to be understood that information shown in table 500 is for illustrative purposes only. In some embodiments, table 500 can include more or less information than what is shown in FIG. 5.

FIG. 6 shows a table 600 that includes association information between an application protocol and one or more application that use the application protocol. Table 600 can include an application protocol section 602 that can list one or more application protocols 610 and an application section 604 that can list one or more applications 612 that use the application protocol for communicating with an accessory.

In some embodiments, a single application can be used to control multiple accessories. In some embodiments, an application can be used to invoke all functionalities of a first accessory, while that same application can be used to invoke only partial functionality of a second accessory. Nonetheless, that application can be said to support both the first and the second accessory. In some embodiments, an application may use more than one application protocol to communicate with the same accessory or different accessories. In the instance where an application uses more than one protocol to communicate with an accessory, the application may use all the supported protocols to communicate with the accessory. In other instances, an application can use only one of the supported protocols for communicating with the accessory.

In some embodiments, in a method for determining an application for use with an accessory, table 500 can be used to determine an application protocol that is associated with a particular accessory. Once that information is determined, table 600 can be used to determine which application uses the application protocol determined earlier. In other embodiments, in a method to determine an accessory for use with an application, table 600 can be used to determine an application protocol used by a particular application. Based on that information, table 500 can then be used to determine one or more accessories that support the determined application protocol. Thus, tables 500 and 600 in combination can be used to determine 1) an application that can be used with an accessory and/or 2) an accessory that can be used with a particular application.

Figure 7:
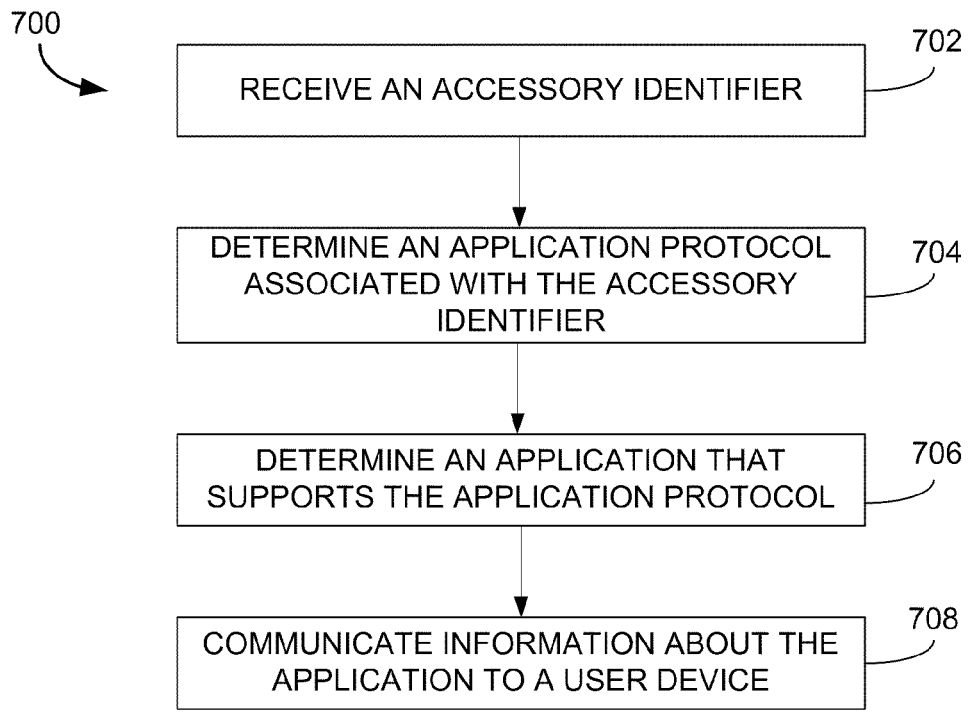
FIG. 7 is a flow diagram of a process for determining an application for use with an accessory according to an embodiment of the present invention.
Figure 8:
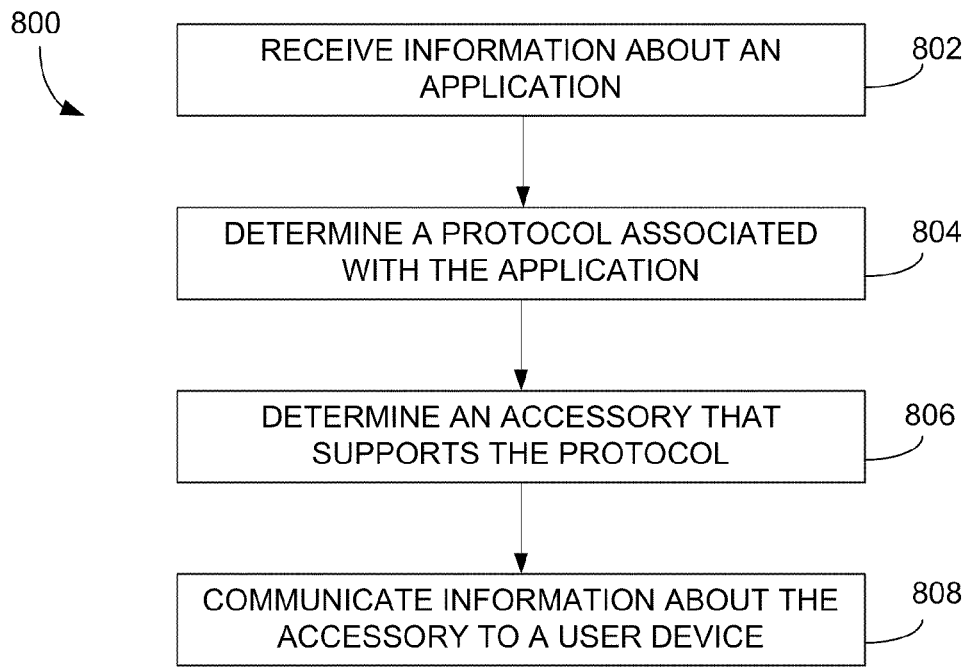
FIG. 8 is a flow diagram of a process for determining an accessory for use with an application according to an embodiment of the present invention.

In some embodiments, the determination server receives a request from the user device to either 1) determine an application that is compatible with a particular accessory or 2) determine an accessory that is compatible with a particular application. FIGS. 7 and 8 illustrate processes for each of these scenarios, as described below.

FIG. 7 is a flow diagram for a process 700 for determining an application that is compatible for use with an accessory according to an embodiment of the present invention. In some embodiments, process 700 may be performed by, e.g., determination server 400 of FIG. 4. In other embodiments, process 700 can be performed by the user device. At block 702, the determination server can receive input about an accessory identifier. As described above, in some embodiments, the accessory identifier may be captured using an input device such as a barcode reader, a RFID reader, a camera, or an infrared reader, or an identifier can be input by the user via the user interface on the user device. In some embodiments, the accessory identifier can be received by the user device using any known Near Field Communication (NFC) technique. In some embodiments, the user device may process the received accessory identifier and convert it into a form usable by the determination server. In some embodiments, the determination server can prescribe a format for the accessory identifier. In this instance, the user device can convert the accessory identifier to the prescribed format prior to sending it to the determination server.

In some embodiments, the accessory identifier may be received by the determination server via the user device. In this instance, the user device can capture the accessory identifier using a communication channel different from the accessory communication protocol. For example, the user device can capture the accessory identifier using an alternate communication channel, e.g., via a barcode reader coupled to the user device or a near filed communication reader coupled to the user device. In some embodiments, the various capture device described above can be incorporated into the user device. In other embodiments, the capture devices may be separate from the user device. In the instance where the accessory identifier information is captured using a barcode reader and/or a near filed communication reader, the accessory identifier information is not communicated to the user device via the accessory communication protocol, but rather the accessory identifier information is communicated to the user device using a communication channel different from the accessory communication protocol. For example, a user can use the user device to scan a barcode on the package of an accessory located on a store shelf. In this instance, the accessory itself is not communicating with the user device, hence the accessory communication protocol cannot be used to transmit the information captured from the barcode. The information captured by the barcode is communicated to the user device using a different communication channel.

At block 704, the determination server searches a database to determine an application protocol that is associated with the accessory identifier, e.g., using table 500 of FIG. 5. Upon determination of the application protocol, the determination server determines an application that uses the application protocol, at block 706, e.g., using table 600 of FIG. 6. Once the application is determined, the determination server communicates the name and other relevant information to the user device at block 708.

It will be appreciated that process 700 described herein is illustrative and that variations and modifications are possible. Acts described as sequential can be executed in parallel, order of acts can be varied, and acts can be modified or combined. For instance, at block 702, the determination server may receive information about an application protocol supported by the accessory, instead of the accessory identifier. In such an instance, process 700 can skip block 704 and proceed directly to block 706.

FIG. 8 is a flow diagram for a process 800 for determining an accessory that is compatible for use with an application according to an embodiment of the present invention. In some embodiments, process 800 may be performed by, e.g., determination server 400 of FIG. 4. In other embodiments, process 800 can be performed by the user device. At block 802, the determination server receives information indicative of an application from a user device. In some embodiments, the information about the application can include name of the application, part number of the application, or a unique string identifier associated with the application. In some embodiments, applications can be identified using a group identifier that is associated with a set of applications provided by a same manufacturer or a set of applications supporting a class of accessories. For example, manufacturer A can provide two different applications that work with the same accessory. In this instance, the two applications combined can have a group identifier that can be used to locate these applications. The criteria for grouping applications can be specified either by the accessory manufacturer and/or the application developer. In some embodiments, the information about the application can be input via the user interface on the user device. In other embodiments, the determination server can automatically determine an application resident on the user device.

At block 804, the determination server uses the information about the application to determine an application protocol that is used by the application, e.g., using table 600 of FIG. 6. In some embodiments, an application can use more than one protocol. At block 806, an accessory that is compatible with the application protocol is determined, e.g., using table 500 of FIG. 5. In some embodiments, a single application protocol may be compatible with more than one accessory. At block 808, the information about the determined accessory is communicated to the user device for presenting to the user.

It will be appreciated that process 800 described herein is illustrative and that variations and modifications are possible. Acts described as sequential can be executed in parallel, order of acts can be varied, and acts can be modified or combined. For instance, at step 802 the accessory and application determination server may receive information about an application protocol associated with an application, instead of information about an application. In this instance, process 800 can skip block 804 and jump to block 806.

Figure 9A:
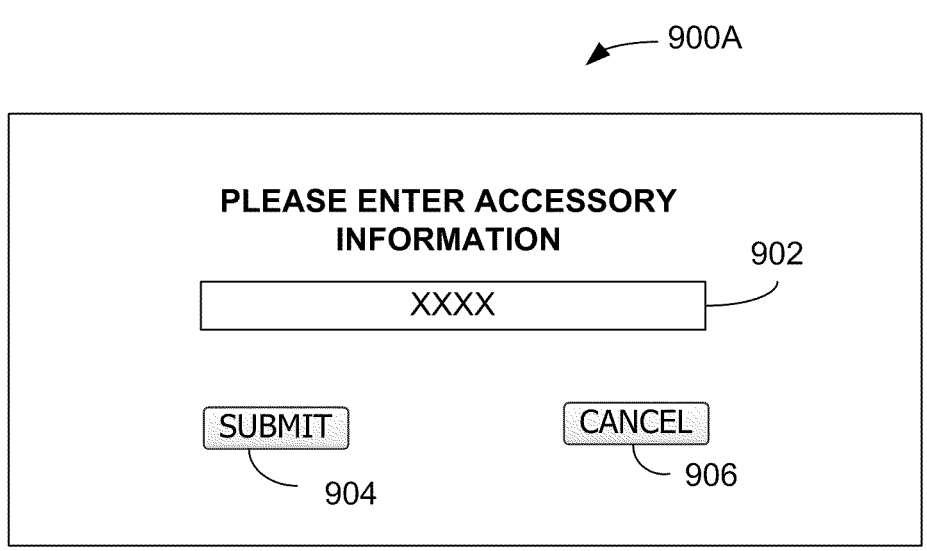
FIGS. 9A and 9B illustrate sample screens that may be presented on the user device for determining an application for use with an accessory, according to an embodiment of the present invention.
Figure 9B:
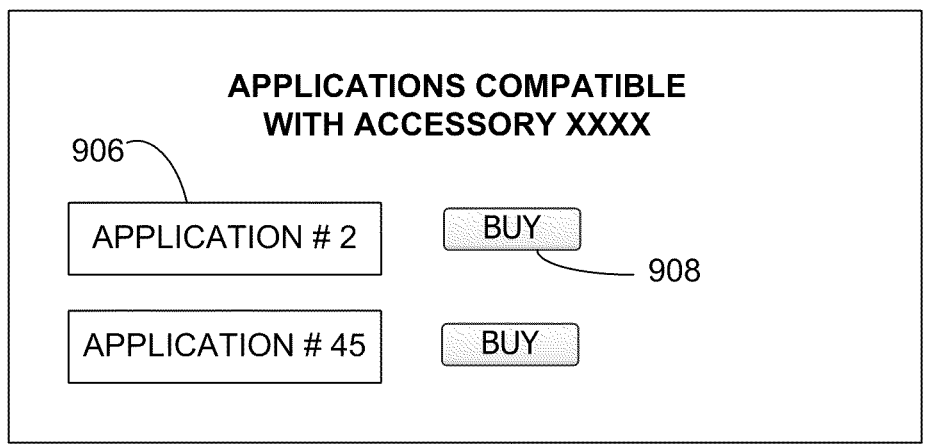

As described above, a user may input an accessory identifier associated with an accessory into his user device in order to determine one or more applications that are compatible with that accessory. FIGS. 9A and 9B illustrate sample user interface screens that the user may interact with to provide information about the accessory to and receive information about an application compatible with the accessory from the user device according to an embodiment of the present invention. Sample screens 900A and 900B may be displayed, e.g., using user interface 204 of user device 200 of FIG. 2 or on kiosk 1100 of FIG. 11A. It is to be noted that screens 900A and 900B are shown for illustration purposes only. One skilled in the art will realize that screens 900A and 900B may include more or less information than what is shown in FIGS. 9A and 9B.

Screen 900A can include an information input section 902. A user may input information about an accessory, e.g., an accessory identifier, in section 902. In some embodiments, section 902 may be automatically populated with accessory identifier information captured by an input device, e.g., a barcode scanner or a RFID reader. In some embodiments, the user device may process the raw information captured by the input device before populating section 902. Once section 902 is populated with the accessory identifier, the user can select submit button 904 to communicate that information to the determination server. In some embodiments, the user may input an accessory name in section 902 instead of an accessory identifier. A cancel button 906 can be provided to return to a previous screen or to cancel the request.

Once the determination server determines the application that is compatible with the accessory, it can communicate information about the application to the user device. The user device can then present the results to the user, e.g., as shown in sample screen 900B. Sample screen 900B can include information section 906 where the information about the compatible application can be presented. In some embodiments, sample screen 900B can also include a 'buy' button 908. When the user selects buy button 908, the user can be directed to a location, e.g., an online shopping site, where the user can purchase the selected application. In this instance, the determination server can be linked to an online application shopping store, e.g., the iTunes® Store provided by Apple Inc.

Although the sample screens described above are shown as presenting the information in a visual form, it is not the only way to present the information to the user. In some embodiments, the information shown in sample screens 900A and 900B can also be presented in an audio form via speakers coupled to the user device.

Figure 10A:
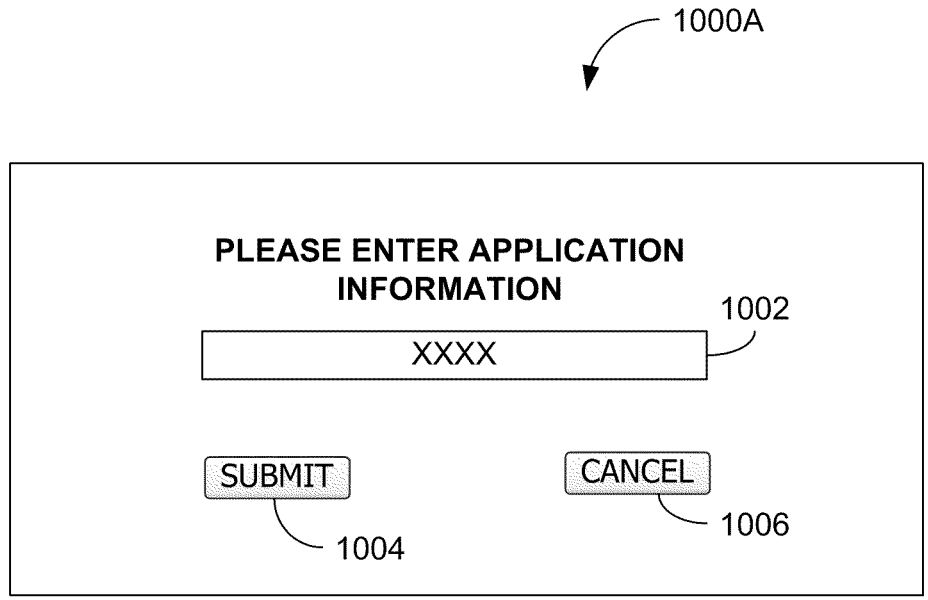
FIGS. 10A and 10B illustrate sample screens that may be presented on the user device for determining an accessory for use with an application according to an embodiment of the present invention.
Figure 10B:
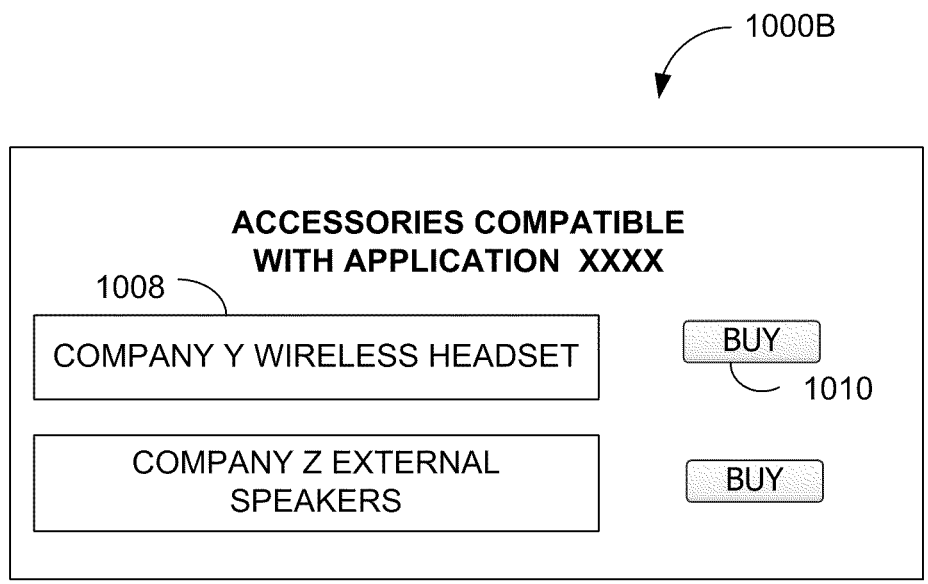

FIGS. 10A and 10B show sample screens that a user may interact with during a process for determining an accessory for use with an application according to an embodiment of the present invention.

FIG. 10A shows sample screen 1000A that can include an information input section 1002, a submit button 1004, and a cancel button 1006. A user may input information about an application, e.g., name of the application, in section 1002. In other embodiments, section 1002 may be automatically populated with application information by the user device. In some embodiments, a list of available applications that have a corresponding accessory may be displayed on screen 1000A and the user can choose one or more applications from the list. Once section 1002 is populated with the application information, the user can select submit button 1004 to communicate that information to the determination server. In some embodiments, the user may input information about an application protocol used by a particular application in section 1002, instead of the application name.

Once the determination server determines the accessory that is compatible with the application, it can communicate the results to the user device. The user device can then present the results to the user, e.g., as sample screen 1000B. Sample screen 1000B can include information section 1008 where the information about the compatible accessory can be presented. In some embodiments, sample screen 1000B can also include a 'buy' button 1010 associated with each compatible accessory. When the user selects buy button 1010, the user may be directed to a location, e.g., an online shopping site, where the user can purchase the selected accessory.

Embodiments of the present invention described above can be implemented in various forms. Some exemplary implementations are described above and below. It is to be noted that many other implementations of the various embodiments described above are possible and the implementations described above and below are in no way intended to limit the scope of the disclosure.

Figures 11A, 11B:
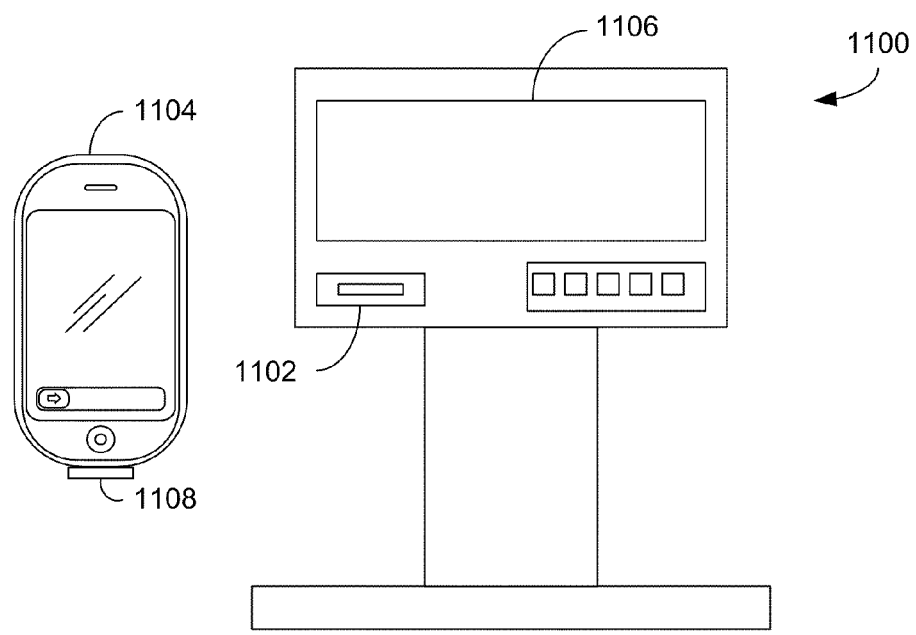
FIG. 11A illustrates a kiosk that can be used to determine an accessory for use with an application and/or an application for use with an accessory, according to an embodiment of the present invention.
FIG. 11B illustrates a sample screen that can be presented on a display of the kiosk of FIG. 11A, according to an embodiment of the present invention.

Users usually have multiple applications resident on their user devices. For example, the iTunes® Store provided by Apple Inc., offers hundreds of thousands of applications that are compatible with the iPhone™ and iPod Touch™ line of user devices. It is often difficult for a user to determine which accessories are compatible with which applications. FIGS. 11A and 11B illustrate an embodiment in which a user can easily get information on the accessories compatible with the applications resident on his user device. This will enable a user to purchase the correct accessory without much effort thereby greatly enhancing the user's shopping experience.

FIG. 11A shows a kiosk 1100 that can include a connector 1102 for connecting to a user device 1104 and a display 1106 for displaying results of the accessory and/or application search. In some embodiments, kiosk 1100 can be located in a brick-and-mortar store that sells accessories for multiple types of user devices. In other embodiments, kiosk 1100 can be located at any location generally accessible to the public e.g., malls, train stations, airports, etc.

Connector 1102 can be used to establish a connection between user device 1104 and kiosk 1100. User device 1104 can be connected to kiosk 1100 by physically connecting kiosk connector 1102 with a complementary connector 1108 on the user device. However, it is not necessary that a physical connection be provided between kiosk 1100 and user device 1104. Any of the wireless techniques described above may be used to establish a connection between user device 1104 and kiosk 1100. Once connected, kiosk 1100 can determine the applications that are resident on user device 1104. Based on that determination, kiosk 1100 can communicate with a server, e.g., determination server 400 of FIG. 4, to request information about one or more accessories that are compatible with the applications resident on user device 1104. In some embodiments, the determination server can be included in kiosk 1100. In some embodiments, a user can input information about an accessory or an application directly into kiosk 1100, e.g., via user input screens of FIGS. 9A and 9B. In this instance, user device 1104 is not needed in order to search for accessories and/or applications.

After kiosk 1100 receives the information about the compatible accessories and/or applications similar to applications resident on user device 110, kiosk 1100 can display the results on display 1106. FIG. 11B shows a sample display screen 1110 with information that can be provided by kiosk 1100. Display screen 1110 can include the name of the accessory 1112, the location of the accessory in the store 1114, and price of the accessory 1116. This information may be used by the user to quickly and accurately locate the accessory that he needs.

In an embodiment, kiosk 1100 can be placed at a trade show and can provide information about all the accessories and applications being presented at the trade show, e.g. Macworld. A user can connect his user device to kiosk 1100 and get information on the various accessories and applications that are compatible with his user device from among the ones being showcased at the trade show. In some embodiments, kiosk 1100 can include a printer to enable a user to print out the information about the applications and accessories. In other embodiments, the information about the accessories and applications can be downloaded to the user device for easy access as the user visits various booths in the trade show. In some embodiments, kiosk 1100 can be equipped with an information capturing device such as a barcode reader, near field communication reader, etc. that can capture the accessory identifier information. In this instance, the accessory or the user device need not be connected to kiosk 1100. A user can simply use the information capturing device of kiosk 1100 to capture the accessory identifier, e.g., by scanning a barcode associated with the accessory. Kiosk 1100 can then use the accessory identifier to identify the relevant applications. In this mode of operation, kiosk 1100 does not use the accessory communication protocol, but rather uses an alternate communication mode in order to capture and receive information from the information capture device.

Figure 12:
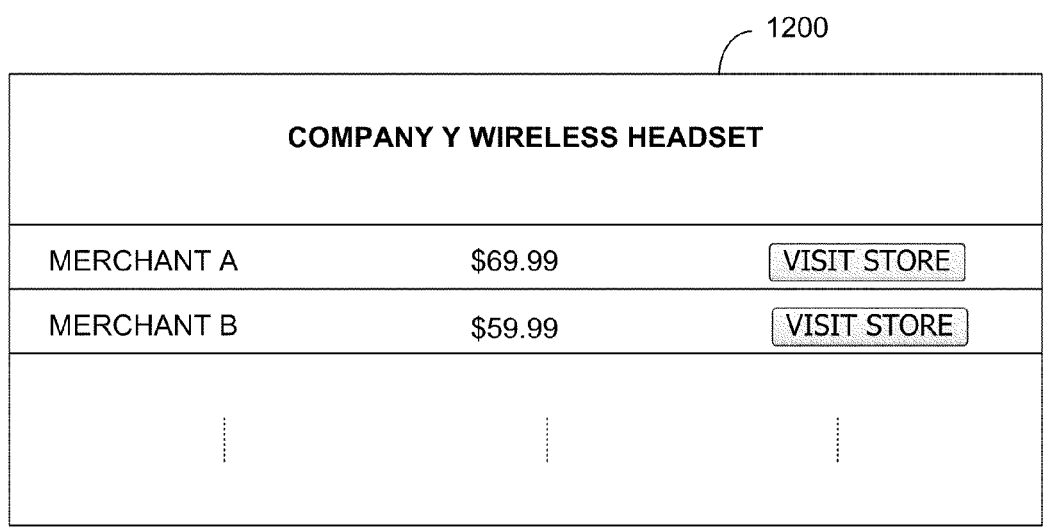
FIG. 12 illustrates a sample screen that can be presented on the user device according to an embodiment of the present invention.

In some embodiments, the determination server can be integrated with one or more online merchants, e.g., Amazon.com and eBay.com. In this instance, when the determination server presents information about the compatible accessory to the user, the user can also be presented with information on buying the accessory from various merchants. FIG. 12 shows a sample screen 1200 that shows information that may be presented to the user for a particular accessory. Merchants A and B can be on-line retailers and the "visit store" buttons can be links to their on-line retail sites. Presenting the information in such a manner enhances the user experience and simplifies the user's shopping experience.

There are various ways in which communication between an accessory and the user device can be initiated. In some embodiments, the user can manually initiate the communication between the user device and the accessory. In other embodiments, the user device, via its accessory discovery process, may automatically initiate communication with an accessory. In still other embodiments, an accessory may automatically initiate communication with a device via the accessory's device discovery feature.

In some embodiments, a store may be outfitted with communication devices, e.g., a wireless access point, which can communicate with the user device to determine the applications resident on the user device. For example, consider a user entering a store with his user device. The various communication devices deployed throughout the store can detect presence of the user device and query the user device for the list of applications resident on the user device. Such a list of applications may be stored outside the secure area of the storage device of the user device. Once the store communication devices have determined the applications resident on the user device, this list may be presented to the sales personnel within the store. The sales personnel can then guide the user to appropriate accessories and/or applications similar to the resident applications without the user even having to explain what he is looking for. This will present a unique shopping experience for a user and can lead to increased business and/or repeat business from satisfied users.

In some embodiments, a user can enter information about an application and request the determination server to locate additional applications similar to the entered application. In this embodiment, the determination server can analyze the information about the entered application and determine an application protocol that is compatible with the application. Based on that information, the determination server can search a database to locate other applications that are also compatible with the application protocol. If a match is found, the list of other applications can be presented to the user via the user device.

In some embodiments, the user can enter information about an accessory that he already owns and request the determination server to determine other accessories similar to the accessory that he owns. In this embodiment, the determination server can analyze the information about the accessory and determine an application protocol that is compatible with the accessory. Based on that information, the determination server can search a database to locate other accessories that are also compatible with the same application protocol. If a match is found, the list of other accessories can be presented to the user via the user device.

In some embodiments, the storage device of the user device can store a list of all accessories and their associated settings that were used with the user device. This information can be used to automatically configure an accessory when the accessory is coupled to the user device at any time after the initial setup. For example, consider that a wireless headset was coupled to the user device and the last time it was used, the volume level was set at 10. The user device can store information about the wireless headset and the associated volume level. When the wireless headset is coupled to the user device at any other time in the future, the user device can automatically set the volume level at 10.

In other embodiments the user device can also store a list of all applications that were installed on the user device at any time and their respective configuration settings. This information can be used to automatically configure an application if it is uninstalled and then reinstalled at a future date, without the user having to perform the configuration process again.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for identifying an application usable with an accessory, the method comprising, by a computer system:

receiving, via a user device, an input indicative of an accessory identifier associated with the accessory, wherein the user device receives the accessory identifier via a first communication channel different from a second communication channel used by an accessory communication protocol for communication between the user device and the accessory;

analyzing the accessory identifier to determine an application protocol associated with the accessory identifier, wherein analyzing the accessory identifier includes accessing a database comprising information associating accessory identifiers with application protocols;

identifying an application that supports the application protocol, wherein identifying the application includes accessing a database comprising information associating application protocols with specific applications that support each application protocol; and providing information about the application to the user device.

2. The method of claim 1 wherein the first communication channel is associated with an input device, the input device comprising one of a barcode scanner, a near field communication unit, or a user interface screen.

3. The method of claim 1 wherein the accessory identifier comprises one or more of:
a universal product code (UPC) associated with the accessory; or
a serial number associated with the accessory; or
a model number associated with the accessory; or
a name of the accessory.

4. A computer server comprising:
an input interface configured to communicate with a requesting device;
a storage medium storing a database, wherein the database comprises:
information associating an accessory identifier with an accessory;
information associating the accessory identifier with an application protocol;
information associating the application protocol with an application that supports the application protocol; and
information associating the application protocol with the accessory; and
a processor coupled to the input interface and the storage device, the processor configured to:
receive input from the requesting device including a first accessory identifier;
execute queries for searching the database based on the input received from the requesting device via the input interface, including executing a first query using the first accessory identifier to identify a first application protocol and executing a second query using the first application protocol to identify at least one application that supports the first application protocol; and
report a query result to the requesting device, the query result including an identifier of the at least one application that supports the first application protocol.

5. The computer server of claim 4 wherein the input comprises at least one of an accessory identifier, information about the application protocol, or information about the application.

6. The computer server of claim 4 wherein the requesting device is an accessory.

7. A non-transitory computer-readable storage medium storing a plurality of instructions that when executed by a processor in a computer system, cause the processor to perform a method for identifying an application usable with an accessory, the method comprising:
receiving an input indicative of an accessory identifier associated with the accessory via an input device, wherein the input device receives the accessory identifier via a communication channel different from another communication channel used by an accessory communication protocol;
determining an application protocol associated with the accessory identifier, wherein determining the application protocol includes accessing a database comprising information associating accessory identifiers with application protocols;
identifying an application that supports the application protocol, wherein identifying the application includes accessing a database comprising information associating application protocols with specific applications that support each application protocol; and
providing information about the application to the input device.

8. The computer-readable storage medium of claim 7 wherein the method further comprises:
determining one or more additional accessories that are compatible with the application protocol; and
providing information about the one or more additional accessories to the input device.

9. The computer-readable storage medium of claim 7 wherein the accessory identifier comprises at least one of a universal product code, a name of the accessory, a serial number of the accessory, or a model number of the accessory.

10. The computer-readable storage medium of claim 7 wherein the input device comprises one of:
a user interface configured to receive input from a user; or
a barcode scanner; or
an RFID tag reader.

11. A kiosk comprising:
an interface for connecting to an external device; and
a processor configured to:
provide a user interface configured to accept input from an external source;
receive, via the user interface, information about an accessory, the information comprising an accessory identifier;
search a database to determine an application protocol supported by the accessory;
search the database to identify an application that supports the application protocol; and
provide information about the application via the user interface.

* * * * *